United States Patent [19]

Berard et al.

[11] 4,140,771

[45] Feb. 20, 1979

[54] PROCESS FOR PREPARING ACTIVE OXIDE POWDERS

[75] Inventors: Michael F. Berard; Orville Hunter, Jr.; Loren E. Shiers, all of Ames, Iowa; Stephen L. Dole, Burnt Hills, N.Y.; Ralph W. Scheidecker, Ames, Iowa

[73] Assignee: The United States of America as represented by the Department of Energy, Washington, D.C.

[21] Appl. No.: 880,921

[22] Filed: Feb. 24, 1978

[51] Int. Cl.² .................... C01F 17/00; C01G 25/02; C01F 5/02
[52] U.S. Cl. .................................. 423/263; 423/592; 423/608; 423/636
[58] Field of Search ................ 423/263, 592, 608, 636

[56] References Cited

U.S. PATENT DOCUMENTS

| 2,610,104 | 9/1954 | Friedel | 423/608 |
|---|---|---|---|
| 3,254,949 | 6/1966 | Clearfield | 423/608 |

OTHER PUBLICATIONS

Hardy et al., "ORNL-4000", Oak Ridge National Lab., Oak Ridge, Tenn., Aug. 1967, 65 pages.

*Primary Examiner*—Herbert T. Carter
*Attorney, Agent, or Firm*—Dean E. Carlson; Frank H. Jackson; James W. Weinberger

[57] ABSTRACT

An improved process for preparing active oxide powders in which cation hydroxide gels, prepared in the conventional manner are chemically dried by alternately washing the gels with a liquid organic compound having polar characteristics and a liquid organic compound having nonpolar characteristics until the mechanical water is removed from the gel. The water-free cation hydroxide is then contacted with a final liquid organic wash to remove the previous organic wash and speed drying. The dried hydroxide treated in the conventional manner will form a highly sinterable active oxide powder.

7 Claims, No Drawings

PROCESS FOR PREPARING ACTIVE OXIDE POWDERS

CONTRACTUAL ORIGIN OF THE INVENTION

The invention described herein was made in the course of, or under, a contract with the UNITED STATES DEPARTMENT OF ENERGY.

BACKGROUND OF THE INVENTION

This invention relates to a method for preparing active oxide powders. More specifically this invention relates to an improved method for preparing active oxide powders which are high sinterable and suitable for preparing shapes having a high percentage of theoretical density.

The preparation of shapes and bodies from oxide powders which have a density which approaches 100% of the theoretical density of the oxides is very important to a number of different industries. For example, certain refractory oxides such as zirconia and hafnia, which may be stabilized by the addition of small amounts of other oxide powders, are under investigation for use as electrodes in the generator channel of a magnetohydrodynamic generator. For this purpose it is generally preferred that the electrodes or at least that portion of the electrode is contact with the MHD working fluid be as dense as possible in order to prevent penetration of the electrode by any of the seed materials which are highly corrosive and which may promote rapid electrode breakdown and disintegration.

Other oxides such as yttria have been proposed for use as electrical insulating materials for high temperature applications, for example, lining the wall of a fusion reactor or separating the electrodes within an MHD channel. For these applications, densities which approach 100% of theoretical are important to improve the physical characteristics and to maintain insulation integrity during operation of the high temperature devices.

A number of zirconia-, hafnia-, and thoria-rare earth ceramics are described in U.S. Pat. No. 3,640,887, Feb. 8, 1972, which are transparent. Uses suggested for these transparent ceramics include windows in furnaces, lenses, in high-temperature microscopes, lamp envelopes and laser application. While other requirements are important, it is also necessary that the powders be sufficiently active or sinterable in order to achieve the high densities required for transparency.

Active oxide powders are conventionally prepared by precipitation. For example, one or more compounds containing the desired cations are dissolved in an aqueous solution generally containing a mineral acid such as nitric or hydrochloric acid to prepare a feed solution. Hydroxyl ion in an aqueous solution such as ammonium or sodium hydroxide is added to neutralize the feed solution - and to add sufficient hydroxyl ion to precipitate the cation as the hydroxide, which forms as a gel. The gel is washed with water to remove any soluble compounds which may be present, and dried to remove the mechanical water, forming a dried hydroxide. The dried hydroxide is then calcined in air or under controlled conditions to form the oxide which is then carefully ground to a finely divided oxide powder suitable for use in preparing dense bodies or shapes. Mixtures of oxide powders may be prepared by coprecipitation of two or more cations dissolved in the feed solution.

While the described method produces ceramic oxide powders of sinterable quantity, high densities, that is those which approach 95% or better of theoretical, are generally either not possible or not possible with any degree of consistency between batches of material prepared at different times. This, of course, presents manufacturing problems when large numbers of shapes or bodies having a particular density or porosity are to be prepared from different batches of powders.

SUMMARY OF THE INVENTION

We have discovered an improvement in the process for preparing oxide powders by the precipitation method by which we are able to prepare active oxide powders which are highly sinterable and from which we are able to obtain consistently high percentages of theoretical densities in bodies and shapes prepared from different batches of these powders. By the method of our invention, a hydroxide gel of the desired cation or mixture of cations is chemically dewatered by alternately washing the gel with a water-miscible liquid organic compound having polar characteristics and a liquid organic compound having nonpolar characteristic, the compounds being immiscible with the hydroxide and miscible with each other, until the gel is dewatered, forming a water-free cation hydroxide, and contacting the water-free hydroxide with a final liquid organic wash, which is immiscible with the hydroxide, miscible with the previous wash and volatile, to prepare the hydroxide for drying, whereby upon drying, calcining the dried hydroxide in air to a cation oxide and grinding the oxide to a powder, a highly sinterable active cation oxide powder is prepared.

It is therefore one object of this invention to provide a method for preparing active oxide powders.

It is another object of the invention to provide an improvement in the conventional method for preparing oxide powder whereby active highly sinterable oxide powders are prepared.

It is a further object of the invention to provide an improvement in the conventional method for preparing active oxide powders whereby bodies and shapes can be prepared from the powder which have a density approaching 100% of theoretical.

Finally, it is the object of the invention to provide an improvement in the conventional method for preparing oxide powders whereby active highly sinterable oxide powders are prepared from which shapes and bodies having consistently high percentages of theoretical densities can be prepared.

DESCRIPTION OF THE PREFERRED EMBODIMENT

These and other objects of the invention may be met by dissolving a compound containing the desired cation in an aqueous solution to form a feed, adding hydroxyl ion as a solution to the feed in an amount sufficient to precipitate the cation as a hydroxide, forming a cation hydroxide gel, washing the gel with water to remove any soluble compounds which may be present therein, contacting the gel with a first liquid organic wash, the first wash being an organic compound having polar characteristics which is immiscible in the hydroxide and miscible with water, thereby partially dewatering the gel and preparing the gel for the second water, contacting the partially dewatered gel with a second wash, the second wash being an organic compound with nonpolar characteristics which is immiscible with the hydroxide and with water and miscible with the first wash whereby the remaining water is stripped from the gel forming a water-free hydroxide, contacting the water-free hydroxide with a final liquid organic wash which is an organic compound immiscible with the hydroxide, miscible with the previous wash and volatile, thereby preparing the cation hydroxide for drying, drying the hydroxide to form a hydroxide powder, calcining the hydroxide powder in air to form the cation oxide and grinding the cation oxide to a powder thereby forming an active highly sinterable cation oxide powder.

The method of this invention is useful for preparing highly sinterable oxide powders from the cations of most elements from which active oxide powders may be useful for producing dense shapes and bodies. The method is also useful for the preparation of active mixed oxide powders of mixed cations. The process has been found particularly suitable for preparing active oxides of yttrium, scandium, magnesium, zirconium, the elements 57 through 71 of the Periodic Table of the Elements, and mixtures thereof including hafnium and zirconium which are either partially or fully stabilized with praseodymium, gadolinium, europium, erbium, yttrium, cerium and terbium.

The cation hydroxide gels may be prepared by any conventional process known to those skilled in the art. For example, a soluble cation compound may be dissolved in water while an insoluble cation compound may require dissolution in an aqueous mineral acid solution to form a feed. Hydroxyl ion in a solution is added to the feed in an amount sufficient to precipitate the cation in the feed as a hydroxide, forming a gel. The hydroxyl ion-containing solution may be any appropriate soluble cation hydroxide depending upon the insoluble cation hydroxide to be formed. The active hydroxide gel should then be washed with water to remove any soluble compounds which may remain in the gel.

The first organic wash may be any liquid organic compound or compounds with polar characteristics which are miscible with water and immiscible with the cation hydroxide, such as the short chain alcohols (less than 5 carbon atoms) methanol, ethanol, isopropanol and n-propanal and the short chain ketones (less than 6 carbon atoms) acetone and methyl ethyl ketone. The action of the first organic wash, as best can be explained, is to remove some of the water from the gel and prepare it for the second wash.

The second organic wash may be any liquid organic compound or compounds with nonpolar characteristics which are miscible with the first organic wash and immiscible with water and with the cation hydroxide. Examples of such compounds are the long chain alcohols (greater than 7 carbons) such as octonal and nonyl alcohol, the nonacid aromatics such as toluene and xylene and cycle hydrocarbons such as cyclohexane. The action of the second wash, as can best be explained, is to strip the remaining mechanical water from the gel, leaving the water-free, organic-dampened cation hydroxide.

The final organic wash may be any liquid organic compound which is miscible with the previous wash, immiscible with the cation hydroxide and volatile, in order to displace the second organic in the hydroxide powder and permit rapid drying of the hydroxide. Preferred final washes include acetone, methyl ethyl ketone, carbon tetrachloride, ether and chloroform, while the short chain alcohols are satisfactory, although with longer drying times. To speed drying, the finally washed cation hydroxide may be heated, alone or combined with grinding.

While it is preferred that the gel be first washed with the liquid organic having polar characteristics, suitable results may be achieved by reversing the order of contact between the polar and nonpolar organics. It is greatly preferred that the last contact of the water-free hydroxide be made with the final organic wash in order to facilitate drying and to achieve the best results.

The ratio of gel to wash solution is not critical, only that there be sufficient solution present to form a suspension with the gel in order to displace the water and the previous wash solution.

The method of contact between the gel and wash solutions is not critical, however, it was found most convenient to make the contact under suction conditions so that the preceding wash is continuously being removed from the gel.

While the preferred number of washes is three, i.e. one contact with each wash solution, the gel may be subjected to any number of washes necessary to obtain the desired results.

After the dewatered hydroxide powder has been dried, it may be converted to an oxide powder by any convenient method known to those skilled in the art. For example, the dewatered dried hydroxide may be crushed or ground to a powder and calcined in air at a temperature high enough to remove the chemically bonded water (hydroxyl ions) and form the oxide or oxides desired. The calcined oxide may then be crushed or ground if necessary to form a finely divided powder suitable for fabrication into high-density ceramic bodies by conventional ceramic processing methods.

The following examples are given as illustrations of the process of the invention for preparing highly active oxide powders, and are not to be taken as limiting the scope of the invention as it is defined by the appended claims.

EXAMPLE I

Twenty grams of gadolinia was dissolved in 300 ml of water containing 25 ml concentrated $HNO_3$. The gadolinia solution was diluted to 1 liter.

2.5 N $NH_4OH$ was dripped into the gadolinium solution until the pH of the precipitant solution was seven. The gadolinium solution is constantly stirred during the precipitating process.

The hydroxide solution was poured into a 5 $\mu m$ porosity sintered-glass filter. The filter is connected to a suction flask to increase the filtering action of the sintered-glass filter when a vacuum is drawn on the suction flask. The gadolinium hydroxide was washed with 500 ml of water followed by 500 ml of acetone, 500 ml of toluene and 500 ml of acetone again. For each wash the precipitate was thoroughly stirred to promote intimate mixing of the precipitate with the wash solution and the eluent was filtered out until a thin layer of wash solution was above the precipitate before a following wash was begun.

The final acetone wash was completely filtered through the precipitate and the precipitate was ground in a heated ($\sim 100°$ C.) mortar and pestle. Any powder not passing through a 325 mesh sieve was reground in an agate mortar and pestle until it passed through a 325 mesh sieve. The ground powder was air-calcined at 750° C. for three hours.

The powder was mechanically pressed at 1750 psi into pellets using a carbide steel die and then isostatically pressed at 30,000 psi.

The pellets were fired in a vacuum furnace at 1800° C. for three hours. Pellets made from powder processed by this method have densities 96–98% of theoretical.

EXAMPLE II

Ten grams of gadolinia was dissolved in a dilute nitric acid solution. Dilute ammonium hydroxide was dripped into the gadolinium solution until it turned litmus paper blue.

The precipitate solution was filtered using a 5 $\mu$m sintered-glass filter attached to a suction flask so a vacuum could be used to increase the filtering rate. The precipitate was washed with 800 ml of water followed by 200 ml of octanol and finally with 275 ml of methanol. The precipitate was repeptized with 200 ml of methanol, poured into a beaker and allowed to air dry.

The dried gadolinium hydroxide powder was ground in an agate mortar and pestle until it passed through a 325 mesh sieve. The powder was calcined for 3 hours at 750° C.

The powder was used to make pellets by mechanically pressing the powder in a carbide steel die to 1750 psi and then isostatically to 30,000 psi. The pellets were fired for three hours at 1800° C. in a vacuum furnace.

Densities of the pellets were 95.6–96.7% of theoretical.

EXAMPLE III

Ten grams of $Er_2O_3$ was dissolved in 400 ml of an aqueous-nitric acid solution. Precipitation was accomplished by dripping $NH_4OH$ into the solution until precipitation was complete (pH$\simeq$7). The material was washed in vacuum suctioned sintered-glass filters. The initial wash utilized about 500 ml of water to remove excess ammonia salts. The material was washed successively with 400 ml of: acetone, toluene and again acetone. In each wash the material was stirred so that intimate mixing of wash liquid and material was achieved. The acetone from the final wash was suctioned off and the nearly dry material was ground in a mortar and pestle (pre-heated to 100° C.) until dry. The powder was passed through 325 mesh and then air-calcined at 950° C. for 3 hours. Specimens were formed by dry pressing in steel dies at 2000 psi and followed by isostatic pressing at 30,000 psi. The formed shapes were sintered under vacuum ($<10^{-4}$ mm) at 2000° C. for 1 hour.

Several batches were made this way and the densities consistently achieved 99% of theoretical or greater.

EXAMPLE IV

A batch of zirconia doped with 33 m/o praseodymium oxide was prepared by the toluene-acetone process. The dried material was ground in a mortar and pestle to pass 325 mesh and the resultant powder was calcined at 950° C. in air for three hours. Specimens were dry formed in a steel die, dried at 2000 psi and then isostatically pressed at 30,000 psi. The pressed material was fired under vacuum at 2000° C. When fired for one hour, the density exceeded 98% of theoretical. When fired for 4 hours, the material achieved theoretical density and was essentially transparent.

The same situation holds for hafnia doped with 33 m/o $Pr_2O_3$ except that the firing temperature is 2100° C.

EXAMPLE V

A batch of pure hafnium oxide was prepared in the same manner as Example III. The only variation in the process was that the hafnia was sintered at 1600° C. for 6 hours. The resultant densities were consistently between 90 and 95% of theoretical. Hot-pressing this material in graphite dies at 1550° C. and 6000 psi yielded specimens in excess of 95% of theoretical density.

EXAMPLE VI

Batches of partially stabilized hafnia (with either 4% $Eu_2O_3$, 4% $Er_2O_3$ or 4% $Y_2O_3$) were prepared in the aforementioned manner and sintered under vacuum at 2000° C. for 1 hour. Resultant densities exceeded 95% of theoretical.

As can be seen by the preceding discussion and examples, the process of this invention provides a substantial improvement in the conventional process for obtaining highly sinterable active oxide powders from which bodies and shapes having consistently high theoretical densities can be obtained.

The embodiments of the invention in which an exclusive property or privilege is claimed are defined as follows:

1. In the process for preparing sinterable cation oxide powders by dissolving a soluble compound of at least one cation in an aqueous solution to prepare a feed, where the cation is a member selected from the group consisting of yttrium, scandium, magnesium, zirconium and elements 57 through 72 of the Periodic Table of Elements, adding a solution of hydroxyl ion to the feed in an amount sufficient to precipitate the cation as a hydroxide forming an insoluble cation hydroxide gel, drying the gel to form a water-free cation hydroxide, calcining the cation hydroxide in air to form the cation oxide powder and grinding the cation oxide to form a sinterable cation oxide powder, the improvement comprising dewatering the gel prior to drying by contacting the gel alternately with a liquid organic compound having polar characteristics and an organic compound having nonpolar characteristics, said compounds being immiscible with the cation hydroxide and miscible with each other, said compound with polar characteristics being miscible with water, until the gel is dewatered, thereby forming a waterfree cation hydroxide, and contacting the water-free cation hydroxide with a final liquid organic wash, the final wash being immiscible with the cation hydroxide, miscible with the liquid organic compounds and volatile at a temperature below about 100° C., drying the dewatered hydroxide gel, calcining the hydroxide gel in air to form the cation oxide; and grinding the cation oxide to a powder, thereby forming a highly sinterable cation oxide powder.

2. The process of claim 1 wherein the hydroxide gel is contacted first with the liquid organic compound having polar characteristics.

3. The process of claim 2 wherein the organic compound having polar characteristics is selected from the group consisting of short-chain alcohols having less than 5 carbon atoms and short-chain ketones having less than 6 carbon atoms.

4. The process of claim 3 wherein the organic compound having nonpolar characteristics is selected from the group consisting of long-chain alcohols containing more than 7 carbon atoms and nonacid aromatic compounds.

5. The process of claim 4 wherein the third liquid wash is selected from the group consisting of acetone, methylethyl ketone, carbon tetrachloride, ether and chloroform and alcohols having less than 5 carbon atoms.

6. The process of claim 5 wherein the organic compound having polar characteristics is selected from the group consisting of methanol, ethanol, isopropanol, n-propanol, acetone, and methyl ethyl ketone.

7. The process of claim 6 wherein the organic compound having nonpolar characteristics is selected from the group consisting of octanol, nonyl alcohol, toluene, xylene and cyclohexane.

* * * * *